United States Patent
Alexander, IV et al.

(10) Patent No.: US 9,922,326 B2
(45) Date of Patent: Mar. 20, 2018

(54) SYSTEM AND METHOD FOR PROCESSING AND FOR FUNDING A TRANSACTION

(75) Inventors: Robert Minter Alexander, IV, Richmond, VA (US); Charles Aaron Rosenblatt, Richmond, VA (US); Daniel R O'Malley, Brookline, MA (US); Scott David Grimes, Richmond, VA (US)

(73) Assignee: CAPITAL ONE FINANCIAL CORPORATION, McLean, VA (US)

(*) Notice: Subject to any disclaimer, the term of this patent is extended or adjusted under 35 U.S.C. 154(b) by 2450 days.

(21) Appl. No.: 11/170,937

(22) Filed: Jun. 30, 2005

(65) Prior Publication Data

US 2006/0004655 A1 Jan. 5, 2006

Related U.S. Application Data

(63) Continuation-in-part of application No. 10/822,999, filed on Apr. 13, 2004.

(51) Int. Cl.
*G06Q 10/00* (2012.01)
*G06Q 20/40* (2012.01)
(Continued)

(52) U.S. Cl.
CPC ......... *G06Q 20/4016* (2013.01); *G06Q 20/00* (2013.01); *G06Q 20/40* (2013.01);
(Continued)

(58) Field of Classification Search
CPC .... G06Q 20/00; G06Q 20/10; G06Q 20/3674; G06Q 20/40; G06Q 20/4016; G06Q 30/02; G06Q 40/02
See application file for complete search history.

(56) References Cited

U.S. PATENT DOCUMENTS 6,029,150 A * 2/2000 Kravitz ........................ 705/39
6,032,136 A    2/2000 Brake, Jr. et al.
(Continued)

FOREIGN PATENT DOCUMENTS

JP    2004-102787    10/2002
JP    2002-288570    4/2004
(Continued)

OTHER PUBLICATIONS

Lee, W.A., In New Payments Era, Cooper plays Hardball; William A. Cooper, American Banker, No. 230, Col. 169, p. 12A, ISSN:0002-7561, Dec. 2, 2004.
(Continued)

*Primary Examiner* — William S Brockington, III
(74) *Attorney, Agent, or Firm* — Hunton & Williams LLP (57) ABSTRACT

Method for processing a transaction, the method comprising automatically requesting a transfer from a source account to a destination account via a communication link, receiving the transfer, adjusting destination account data associated with the destination account by increasing a balance of the destination account by an amount of the transfer, receiving transaction data from a merchant indicating an attempted transaction, the transaction data including a transaction amount and data identifying the destination account, and processing the attempted transaction.

28 Claims, 6 Drawing Sheets

(51) Int. Cl.
- *G06Q 20/00* (2012.01)
- *G06Q 20/10* (2012.01)
- *G06Q 20/36* (2012.01)
- *G06Q 30/02* (2012.01)
- *G06Q 40/02* (2012.01)

(52) U.S. Cl.
CPC ......... *G06Q 20/10* (2013.01); *G06Q 20/3674* (2013.01); *G06Q 30/02* (2013.01); *G06Q 40/02* (2013.01)

(56) References Cited

U.S. PATENT DOCUMENTS

| | | | |
|---|---|---|---|
| 6,065,675 A | 5/2000 | Teicher | |
| 6,105,001 A | 8/2000 | Masi et al. | |
| 6,202,054 B1 | 3/2001 | Lawlor et al. | |
| 6,295,522 B1 | 9/2001 | Boesch | |
| 6,332,134 B1 | 12/2001 | Foster | |
| 6,505,772 B1 | 1/2003 | Mollett et al. | |
| 6,609,113 B1* | 8/2003 | O'Leary et al. | 705/39 |
| 2001/0047342 A1 | 11/2001 | Cuervo | |
| 2001/0054003 A1* | 12/2001 | Chien et al. | 705/14 |
| 2002/0029194 A1* | 3/2002 | Lewis et al. | 705/39 |
| 2002/0103752 A1 | 5/2002 | Berger et al. | |
| 2002/0052841 A1 | 8/2002 | Guthrie et al. | |
| 2002/0143655 A1* | 10/2002 | Elston | G06Q 20/02 705/26.81 |
| 2003/0033245 A1* | 2/2003 | Kahr | 705/39 |
| 2003/0097270 A1* | 5/2003 | Musselwhite et al. | 705/1 |
| 2003/0135462 A1 | 7/2003 | Brake, Jr. et al. | |
| 2003/0233333 A1 | 12/2003 | Lee et al. | |
| 2005/0192897 A1 | 2/2005 | Rogers et al. | |
| 2005/0102188 A1* | 5/2005 | Hutchison et al. | 705/26 |
| 2005/0234817 A1 | 10/2005 | VanFleet et al. | |
| 2006/0004655 A1 | 1/2006 | Alexandar, IV et al. | |
| 2006/0026073 A1 | 2/2006 | Kenny, Jr. et al. | |
| 2006/0036540 A1 | 2/2006 | Lawrence et al. | |

FOREIGN PATENT DOCUMENTS

| | | |
|---|---|---|
| WO | WO 01/52211 | 5/2000 |
| WO | WO 01/54026 | 7/2001 |

OTHER PUBLICATIONS

Ewoldt, John, Word of Mouth, It's in the cards: Readers respond, Star Tribune, Variety, p. 1E, Oct. 30, 2004.

Ewoldt, John, Dollars & Sense, Redeeming qualities, TCF's new Miles plus card takes on U.S. Bank's WorldPerks Visa card., Star Tribune, Variety, p. 1E, Oct. 21, 2004.

Wayzata, Minn, TCF Reports Third Quarter Earnings and EPS of $.45, Third Quarter Highlights, PR Newswire US, Oct. 14, 2004.

With ACH Transactions growing, TCF Bank Joins Nacha, Cardline, vol. 4, No. 33, p. 1, Aug. 13, 2004.

Wayzata, Minn, TCF Introduces New High-Yield Checking Account With Free Air miles Card, PR Newswire, Financial News, Aug. 12, 2004.

Kuykendall, Lavonne, Lindenmayer, Isabelle, Responses to Visa's Interchange Fee Revamp Vary; Visa U.S.A. Inc., American Banker, No. 213, vol. 169, p. 7, ISSN: 0002-7561.

Wade, Will, Why TCF is STAYING in Payments Debate, TCF Financial Corp. joins NACHA-Electronics Payment Associateion, American Banker No. 157, vol. 169, p. 1, ISSN:0002-7561, Aug. 16, 2004.

Wade, Will, TCF National of Minnesota joins Nacha, Brief Article, American Banker, No. 155, vol. 169, p. 12, ISSN: 0002-7561, Aug. 12, 2004.

Ron Lieber, Reward Plans for Debit Cards Get Revamped, Wall Street Journal, Jul. 3, 2003, pp. D1 and D2.

* cited by examiner

SYSTEM AND METHOD FOR PROCESSING AND FOR FUNDING A TRANSACTION

This application is a continuation-in-part of U.S. patent application Ser. No. 10/822,999 filed Apr. 13, 2004, entitled "System and Method For Processing and For Funding a Transaction," the contents of which are incorporated herein in their entirety to the extent that it is consistent with this invention and application.

FIELD

The present application relates to a banking system and method and, more particularly, to a system and method for providing transactional access to an account.

BACKGROUND

Credit cards, debit cards and other types of transaction cards are commonly used today by consumers to fund transactions at or with merchants. When credit cards and debit cards are used by consumers, interchange rates are routinely imposed by a bankard association. An interchange rate is generally a percentage of a transaction amount and the percentage is set by the bankcard association. Acquiring banks are charged the interchange rate for a consumer transaction by the card association. An acquiring bank is a financial institution that contracts with merchants to settle electronic transactions. For credit card transactions, an acquiring bank provides the merchant with its credit card processing account. This acquiring bank sends credit card and purchase information for transactions to a card association (such as Visa® and MasterCard®), which forwards it to the issuer associated with the credit card. The card association also collects interchange revenue due to the interchange rate imposed for each transaction associated with the respective credit or debit card and forwards at least a portion of that revenue to the issuer. Interchange rates for credit card transactions are commonly higher than interchange rates for debit cards.

Also commonly used today in the banking industry is automated clearing house ("ACH") transactions. ACH is a form of electronic payment. Specifically, ACH is an electronic fund transfer through an ACH network including the Federal Reserve Bank from one account to another account, such as to a checking or savings account. ACH is typically used to process payments for settlement within one or two business days. ACH transactions are settled in a manner similar to the way checks are settled: The clearinghouse takes all ACH files received daily from its member banks, sorts them by the originating bank (the bank where the check was cashed or deposited) and the paying bank (the bank against which the check was drawn), totals the accounts, and credits or debits appropriate accounts accordingly. A company can issue an ACH debit for a purchase amount through the ACH network to a customer's account at the customer's bank. A company can also initiate a purchase upon receipt of an ACH credit.

Numerous financial institutions, such as credit card companies and banks, and other companies, such as airline carriers, hotels and retailers, offer membership reward programs to their customers. Traditionally, membership reward programs are funded at least in part by the interchange revenue collected by the respective financial institution. These membership reward programs often provide their participants the ability to earn and accumulate units or portions thereof that are operable as currency, such as points, stars and miles. Participants earn such units, for example, when conducting transactions with a qualified account or engaging services with the qualified account. The units are redeemable for merchandise or services with participating merchants. Further, these membership reward programs offer other rewards to participants for being enrolled in the respective reward program that do not involve the redemption of points or the like, such as a companion airline ticket upon purchasing an airline ticket with a qualified account. Depending on the reward program enrolled in by a participant, certain rewards may not be available to the respective participant. For instance, program X may not offer particular merchandise or services to its participants, whereas program y does offer such merchandise or services. A participant may use a transaction card associated with the qualified account to conduct the respective transaction. Reward units typically accrue at a rate of one unit for every dollar spent using the account and the accrued units operate as currency. Some entities restrict purchasing to particular merchants to earn reward units, whereas other financial institutions have no such restrictions. The maximum reward units a participant can earn annually are usually unlimited. Sometimes, however, a cap is imposed on the amount of reward units a participant can earn. Additionally, reward units usually do not accumulate on cash advances, convenience checks, balance transfers, fees or adjustments. When merchandise purchased with the respective account is returned, the account credit will result in a reduction of reward units.

Participants usually seek to accumulate enough reward units to purchase merchandise or services. For instance, a participant may seek to accumulate enough reward units to purchase a particular product from an associated merchant or purchase an airline ticket from another associated merchant. Depending on the program, only certain merchants are considered qualified merchants with whom reward units can be redeemed towards a purchase.

Membership reward programs also often offer participants other rewards, incentives or the like instead of or in addition to the ability to accumulate reward units. For example, some membership reward programs return to a participant a predetermined percentage of a transaction amount or of an amount spent during a predetermined period (referred to as "cash back") either as a credit to an account or by check, offer participants discounts on select merchandise or services, and complimentary merchandise or services.

Typically, participants earn rewards when using transaction cards associated with a credit line, such as conventional credit cards. Few debit card issuers, however, offer rewards for use of their debit cards at least in part because companies like Mastercard® and Visa® collect lower interchange revenue from merchants and consequently pay less to the respective issuers. As a result, debit card issuers do not have sufficient revenue to fund programs such as rewards programs. Moreover, consumers commonly obtain their debit cards from the same banks which provide their checking or other demand deposit account.

Therefore, a need exists for a system and method that utilizes a transaction vehicle, for instance, a transaction card with an interchange rate, associated with a destination account, the destination account being funded on a predetermined basis, such as daily, weekly or monthly, through ACH or otherwise by another account associated with the issuer of the transaction vehicle or a different financial institution. There is also a need to offer an account holder debit functionality linked to an account, such as the destination account, yet provide a predetermined delay before a transaction is funded through ACH or otherwise and a system and method for the account holder to challenge the validity of that respective transaction during the predetermined delay. Accordingly, the account holder is provided with enhanced fraud protection.

SUMMARY

An aspect of the present application provides for a method for processing a transaction, the method comprising receiving a transfer from a source account via a communication link, adjusting destination account data associated with a destination account by increasing a balance of the destination account by an amount of the transfer, receiving transaction data from a merchant indicating an attempted transaction, the transaction data including a transaction amount and data identifying the destination account, and processing the attempted transaction.

Another aspect of the present application provides for a method for processing a transaction, the method comprising receiving transaction data indicating an attempted transaction, the transaction data including a transaction amount and data identifying a destination account, processing the attempted transaction; requesting a transfer for the transaction amount to be transmitted from a source account to the destination account; and receiving the transfer.

A further aspect of the present application provides for a method for processing a transaction, the method comprising receiving transaction data from a merchant indicating an attempted transaction by an account holder, the transaction data including a transaction amount and data identifying a destination account, processing the attempted transaction for determining at least one source account to fund the transaction amount, the at least one source account and destination account being associated with different entities, requesting a transfer for the transaction amount to be transmitted to the destination account from the determined at least one source account; and receiving the transfer.

BRIEF DESCRIPTION OF THE DRAWINGS

The present application can be more fully understood by reading the following detailed description of the presently preferred embodiments together with the accompanying drawings, in which like reference indicators are used to designate like elements, and in which.

DETAILED DESCRIPTION

The exemplary embodiments of the present application are described with reference to an account holder having a plurality of accounts, including a destination account, and having the ability to access the destination account with various transaction vehicles, including, for instance, the use of at least one associated transaction card. The account holder can use the transaction card or other transaction vehicle, for example, to make a purchase at or with a merchant. The appearance of the transaction vehicle can represent a credit card, a debit card, an ATM card, a smart card and a fob, for instance a radio frequency identification ("RFID") key fob, and, thus, is not meant to be limited to any particular type of card or other device and associated account. Transactions conducted with certain types of transaction vehicles, however, are processed using an interchange rate, as described herein in more detail. As is well known in the art, some transactions can be conducted without presenting a physical transaction vehicle at a point-of-sale ("POS"). Rather, an account holder can present a predetermined number or alphanumeric combination of letters and numbers associated with one or more accounts to perform a transaction. Further, transaction vehicles can be administered by various companies, such as banks, credit card companies, or other institutions or companies.

As described above, the exemplary embodiments of the present application are described with reference to an account holder having a destination account that can be accessed with a variety of transaction vehicles, including, for instance, using a transaction card. The destination account can be funded by one or more source accounts previously specified by the account holder. The account holder can add to or remove from the list of available one or more source accounts linked to the destination account. In an exemplary embodiment, the destination account is funded to cover an amount of a transaction after the account holder initiates the transaction.

Figure 1:
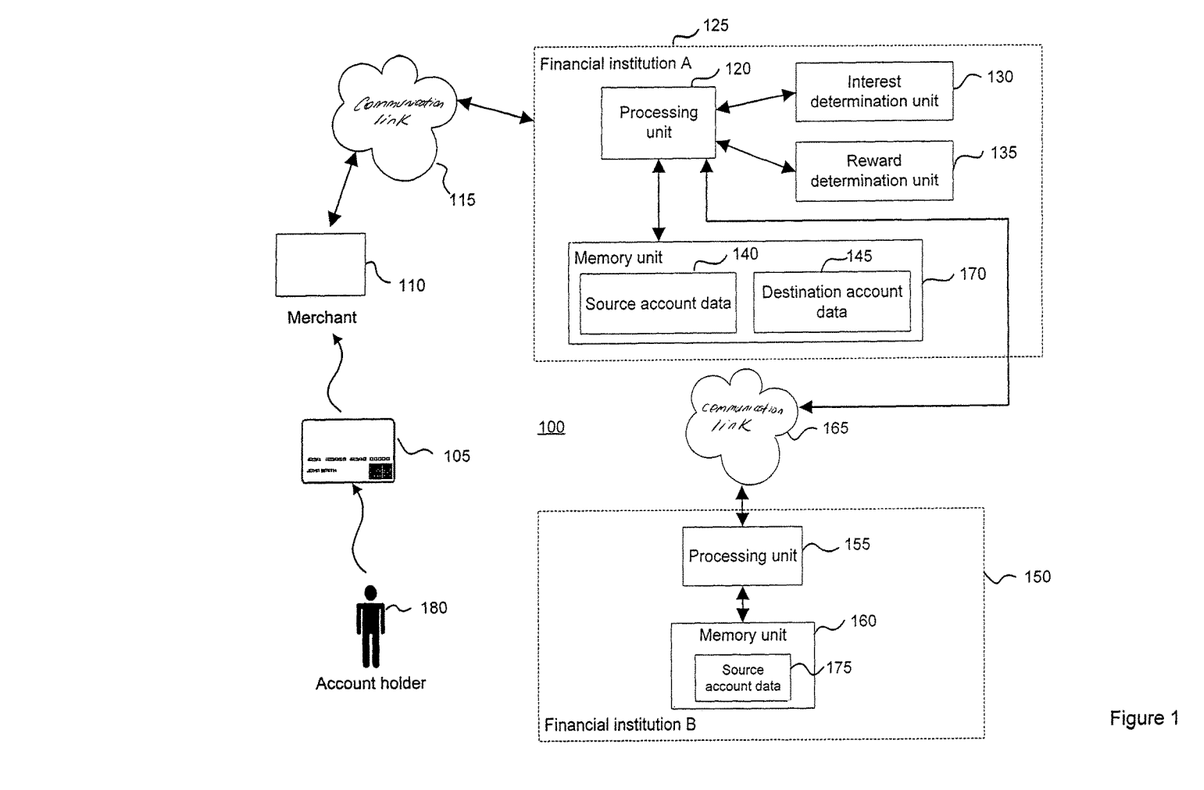
FIG. 1 illustrates an exemplary transaction system according to the exemplary embodiments of the present application.

FIG. 1 illustrates an exemplary transaction system 100 according to the exemplary embodiments of the present application. Transaction system 100 includes merchant 110, financial institution A 125 in communication, either directly or indirectly, with merchant 110 via communication link 115, for example, a debit network, a credit network or a debit and credit network, and financial institution B 150. Communication link 115 or a portion of communication link 115 can be a landline link, a wireless link or a combination thereof. Financial institution A 125 includes processing unit 120, interest determination unit 130, reward determination unit 135 and memory unit 170 having stored therein source account data 140 and destination account data 145. Source account data is associated with at least one source account, including for instance source account 425, and destination account data 145 is associated with destination account 410, depicted in FIG. 4. Alternatively, the functionality provided by interest determination unit 130 and reward determination unit 135 can instead be provided by processing unit 120 or in conjunction with processing unit 120. Financial institution B 150 includes processing unit 155 in communication, either directly or indirectly, with memory unit 160 having stored therein source account data 175. Source account data 175 is associated with at least one source account, including for instance source account 415, also shown in FIG. 4. Destination account 410 can also be associated with a third party instead of financial institution A 125.

Figure 4:
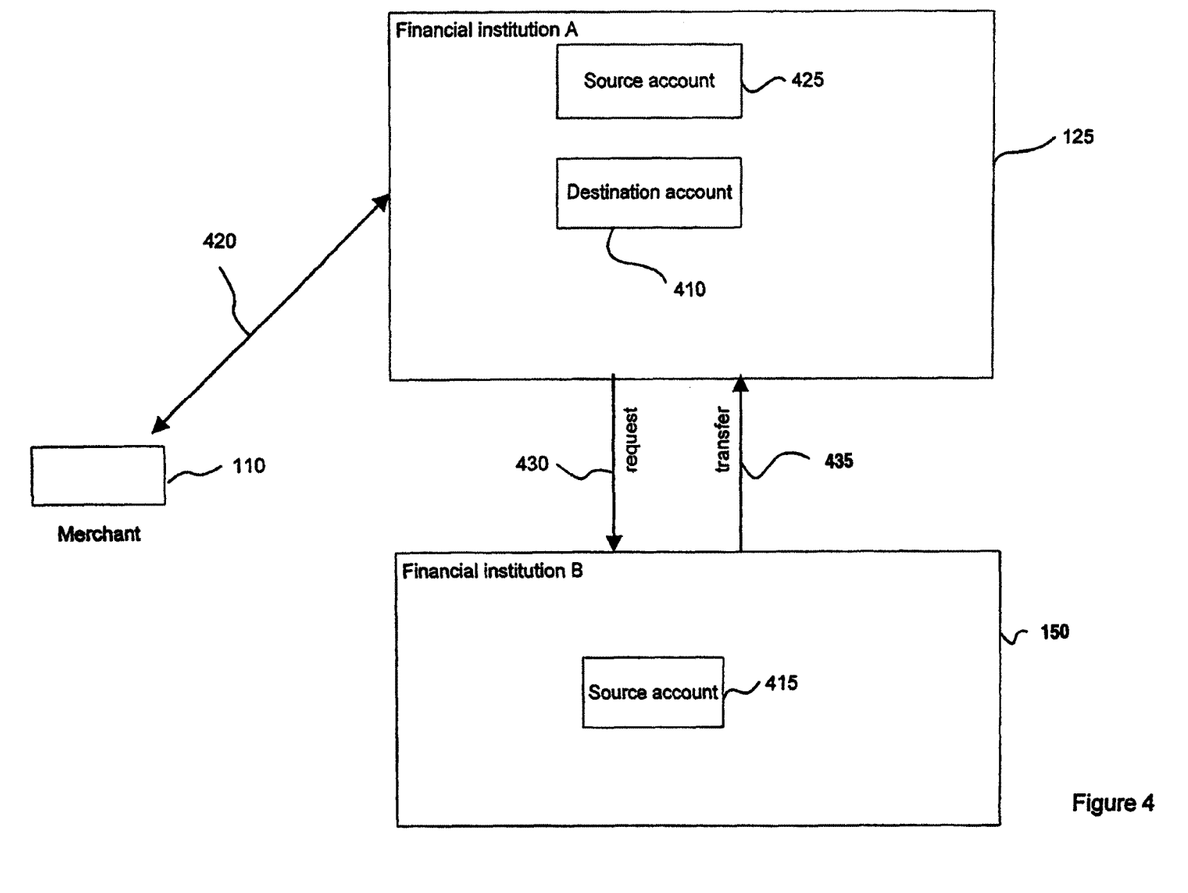
FIG. 4 illustrates in more detail the exemplary transaction system shown in FIG. 1.

Financial institution A 125 transmits data to and receives data, for instance, transfer 435 as shown in FIG. 4, from financial institution B 150 via communication link 165. The use of communication link 115, such as a debit network, a credit network or a debit and credit network, for transmitting and for processing credit and debit transaction data is well known in the art and therefore is not described in detail herein. Similarly, the use of communication link 165, such as an ACH network, for transmitting and for processing transfer 435 is well known in the art and hence is also not described in detail herein. The present application is not limited to using an ACH network to transfer funds in or out a destination account and a debit network, a credit network or a debit and credit network for an account holder to access the destination account. Rather, funds can be transferred in or out of the destination account in any manner. Exemplary communication links for transferring funds in or out of the destination account include wiring, ACH, electronic funds transfer, ATM networks, Visa®, MasterCard® or the like.

Transaction card 105 is operable for account holder 180 to purchase at or with merchant 110 to cause data to be transmitted to and from financial institution A 125 regarding that transaction. Financial institution A 125 issues to account holder 180 transaction card 105, financial institution A 125 being a credit card company, a bank, a mortgage company or any other type of financial institution or company. Like financial institution A 125, financial institution B 150 is linked to financial institution A 125 and can be a credit card company, a bank, a mortgage company or any other type of financial institution or company.

Memory unit 170 and memory unit 160 associated with financial institution A 125 and financial institution B 150, respectively, can include various types of memory storage devices, for example, one or more databases, relational or otherwise and, therefore, is not meant to be limited to any particular type of storage device or quantity of storage devices operating alone or in combination. Memory unit 170 stores data including, for instance, source account data 140 and destination account data 145, and memory unit 160 stores data including, for example, source account data 175. As will be appreciated by a person having ordinary skill in the art, memory unit 170 and memory unit 160 can store other data associated with account holder 180, such as personal data, transaction history data, security data and data associated with accumulated and redeemed rewards. Memory unit 170 and/or memory unit 160 can also store data associated with one or more additional source accounts that are linked to the destination account, the one or more additional source accounts being associated with financial institution A 125 and/or financial institution B 150. As will be described in more detail herein, a source account can be associated with another entity besides financial institution A 125 and financial institution B 150, as described in the present application with reference to FIG. 5.

Communication link 115 can be a debit network, a credit network or a debit and credit network including the MasterCard®/Visa® network or other proprietary networks, such as Plus, Novus (debit), Diner's Club® (credit) and American Express®, the operation and use of which are well known in the art and are, thus, not described herein. Transaction data associated with a transaction between account holder 180 and merchant 110 is transmitted using communication link 115. The present application is not limited to using a debit network, a credit network or a debit and credit network or other proprietary networks. Rather, an ACH network, Internet based payment networks, processor based payment networks, for instance, the First Data network, could be used instead of or in combination with the debit network, the credit network or the debit and credit network. For instance, transaction data can also be transmitted through an Internet link, through a mail link and through a telephone link instead of a debit/credit network or in combination with a debit/credit network.

The components of FIG. 1 may be implemented through hardware, software, and/or firmware. The components in transaction system 100 are not limited to those illustrated.

Figure 2:
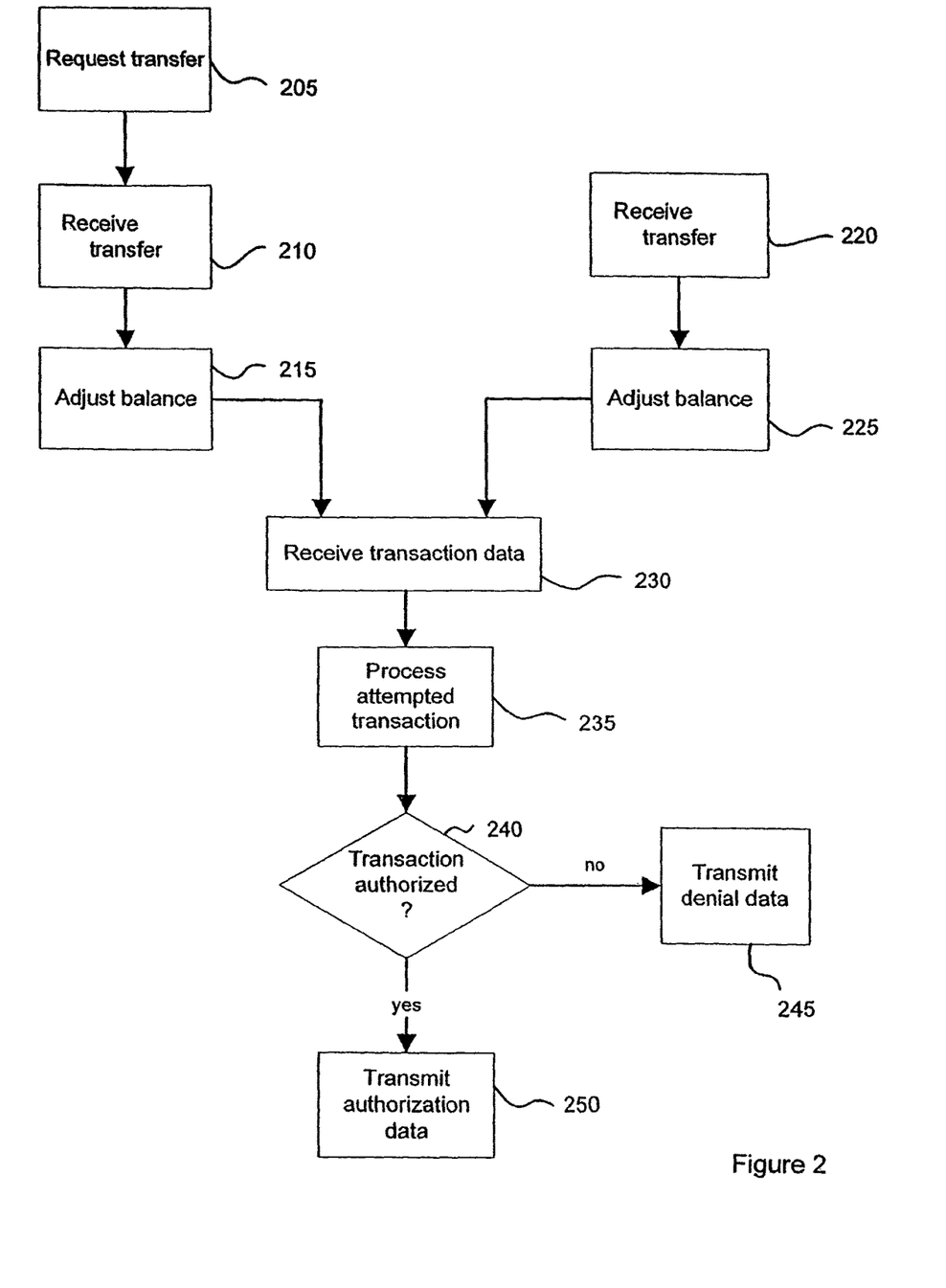
FIG. 2 illustrates an exemplary flow diagram for processing a transaction according to the exemplary embodiments of the present application.

FIG. 2 illustrates an exemplary flow diagram for processing and for funding a transaction according to the exemplary embodiments of the present application. Financial institution A 125 is in communication with financial institution B 150 so that funds can be electronically transferred to or from the respective financial institution via communication link 165. In an exemplary embodiment, fund transfers occur automatically on a recurring basis at a predetermined time, for instance, daily, weekly, monthly or yearly, or a combination thereof, as described herein in more detail. Alternatively, fund transfers can occur upon request, as opposed to automatically, for example, by account holder 180, by financial institution A 125 and/or by financial institution B 150, also described herein in more detail with reference to FIG. 3.

In FIG. 2, transfer 435 occurs automatically at a predetermined time for a predetermined amount before a transaction is attempted by account holder 180. The automatic transfer 435 is either initiated by financial institution A 125 via request 430, described herein with reference to 205-215, or is initiated by financial institution B 165, as described herein with reference to 220-225. When initiated by financial institution A 125 by request 430, a predetermined amount of funds are requested by processing unit 120 to be transferred to destination account 410 associated with financial institution A 125 from source account 415 associated with financial institution B 150, in 205, as shown in FIG. 2. Processing unit 120 receives the requested transfer from financial institution B 150, in 210, and updates destination account data 145 stored in memory unit 170 associated with account holder 180 by increasing the stored balance data by the amount of transfer 435, in 215. Further, processing unit 155 of financial institution B 150 updates source account 415, in particular, source account data 175 stored in memory unit 160, also associated with account holder 180 by decreasing the stored balance data by the amount of transfer 435. In an exemplary embodiment of the present application, the amount of the automatic transfer 435 is determined by the respective account holder, for instance, account holder 180, and the predetermined time, for instance, daily, weekly, monthly or yearly, when transfer 435 occurs is also determined by that account holder. Alternatively, the amount of transfer 435 is not predetermined by account holder 180.

When financial institution B 150 initiates transfer 435, processing unit 155 of financial institution B 150 automatically transfers the predetermined amount of funds from source account 415 to destination account 410 at financial institution A 125 at the predetermined time via transfer 435 through communication link 165. Transfer 435 is received by processing unit 120, in 220. Similar to when financial institution A 125 initiates transfer 435, processing unit 120 adjusts destination account data 145 including the balance data by increasing the balance data by the amount of transfer 435, in 225. Also, processing unit 155 adjusts source account data 175 by decreasing the stored balance data by the amount of transfer 435.

Thus, processing unit 120 of financial institution A 125 can automatically request the transfer of the predetermined amount of funds from source account 415 to destination account 410 via transfer 435 at the predetermined time or processing unit 155 of financial institution B 150 can automatically transfer the predetermined amount of funds from source account 415 to destination account 410 at financial institution A 125 via transfer 435 at the predetermined time, as described herein. In both instances, an account balance of destination account 410 is increased which is reflected by destination account data 145 stored in memory unit 170. Accordingly, funds will be available for account holder 180 to conduct at least one transaction at or with merchant 110. The transaction may have imposed thereon a credit card interchange rate if transaction card 105 is, for instance, operable as a credit card. Alternatively, an interchange rate other than a credit card interchange rate is imposed, for instance, a debit card interchange rate. In a further alternative embodiment, the transaction is not imposed with any interchange rate regardless whether the transaction is initiated by account holder 180 with a transaction card or without a transaction card or other transaction vehicle.

As shown in FIG. 2, after the occurrence of transfer 435, account holder 180 can present transaction card 105 to merchant 110, for instance, at a POS for conducting a transaction with merchant 110. A device or devices located at merchant 110, such as a POS terminal, read a magnetic stripe located on transaction card 105 or a memory unit located on transaction card 105 if transaction card 105 is a smart card or the like. Transaction data including at least a transaction amount and an account number associated with transaction card 105 is received by processing unit 120 of financial institution A 125 via communication link 115, in 230. In an exemplary embodiment, the received account number is associated with destination account 410 and destination account data 145 stored in memory unit 170. The account number, however, can be associated with another account linked to destination account 410.

In transaction system 100, a credit card interchange rate may be imposed for the transaction conducted by account holder 180 at merchant 110 using transaction card 105. Accordingly, the interchange revenue earned by the issuer of transaction card 105, for instance, financial institution 125, may be greater than the interchange revenue earned from a debit card interchange rate.

The present application, however, is not limited to using a transaction vehicle such as transaction card 105 to access destination account 410. Destination account 410 can be accessible to account holder 180 in variety of ways including, for example, by check, via the Internet, via an automated teller machine, via an RFID fob, in-person, for instance, at a bank branch or the like, by interacting with a customer service representative or voice response unit, a direct host-to-host connection, wireless communication with a bank processor, for example, via Blackberry, a personal digital assistant or wireless telephone, or any other method for accessing an account regardless of the type of account. Destination account 410 may be used, for instance, to make on-line bill payments.

Once the transaction data is received by processing unit 120, in 230, processing unit 120 processes the attempted transaction by account holder 180, in 235. Specifically, processing unit 120 determines from the received transaction data the account number associated with transaction card 105 used by account holder 180 at merchant 110 and the transaction amount. Since in an exemplary embodiment the account number is associated with destination account 410, processing unit 120 accesses destination account data 145 stored in memory unit 170 to determine whether to authorize the attempted transaction, in 240. More particularly, processing unit 120 compares the balance of destination account 410 to the transaction amount to determine whether the balance is greater than or equal to the transaction amount. If the balance of destination account 410 is greater than or equal to the transaction amount, then processing unit 120 authorizes the attempted transaction and transmits authorization data to merchant 110 via communication link 115, in 250. As will be appreciated by a person having ordinary skill in the art, if account holder 180 initiated the transaction in a manner that does not necessitate the use of communication link 115, communication link 115 is not utilized, for example, if account holder 180 initiates the transaction by check or in-person. If, however, the balance of destination account 410 is less than the transaction amount, then processing unit 120 denies the attempted transaction and transmits denial data to merchant 110 via communication link 115, in 245.

Alternatively, if the balance of destination account 410 is less than the amount of the attempted transaction, a credit line associated with financial institution A 125 or financial institution B 150, or another demand deposit account associated with account holder 180 is accessed by processing unit 120 to cover the amount of the attempted transaction or a portion thereof not covered by the balance of destination account 410. Account holder 180 can also be charged a predetermined transaction fee for utilizing the overdraft protection benefit associated with transaction card 105. The credit line or demand deposit account may or may not be linked to only destination account 145 or be operable for only serving an overdraft protection function.

Figure 3:
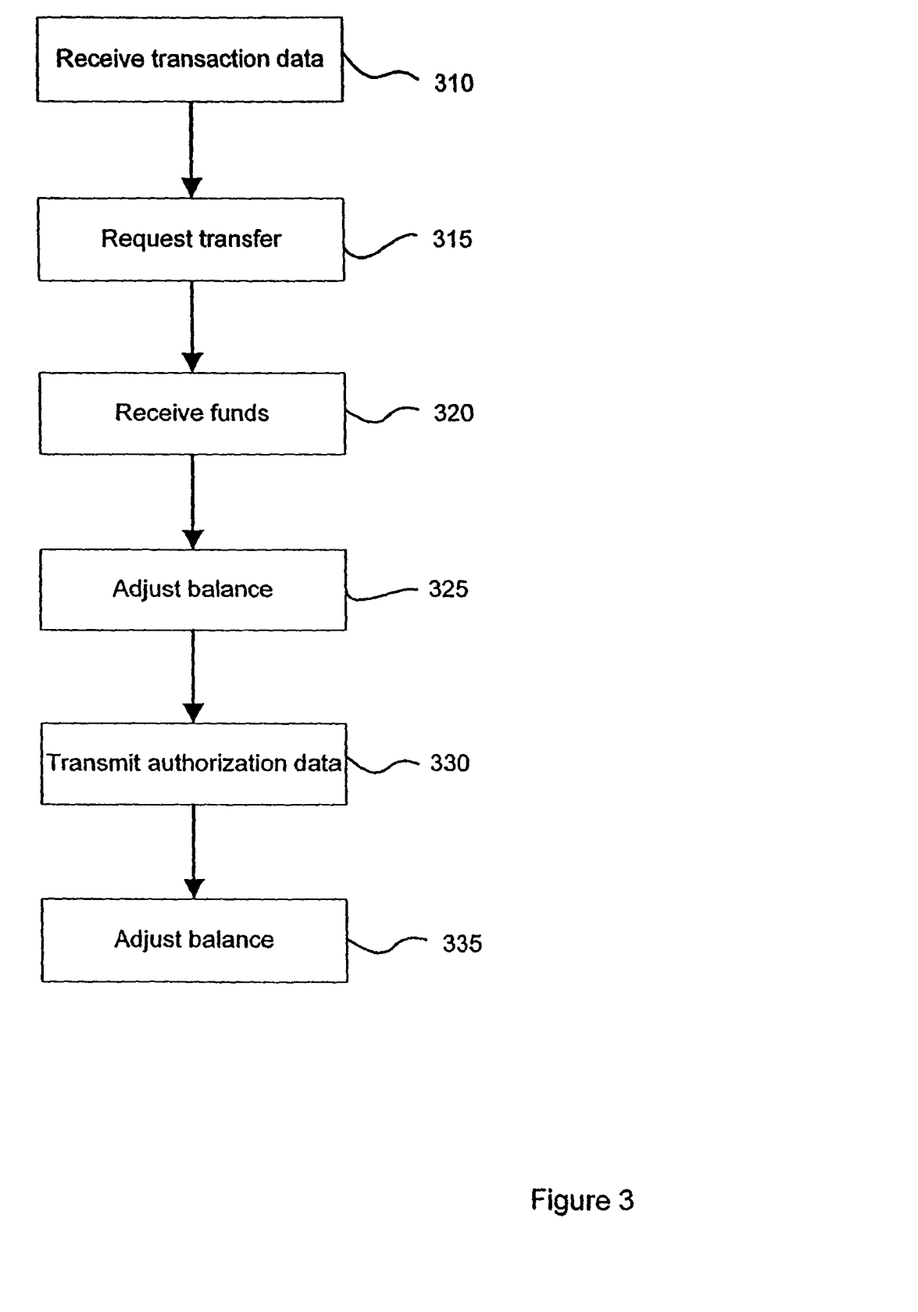
FIG. 3 illustrates another exemplary flow diagram for processing a transaction according to the exemplary embodiments of the present application.

Destination account 410 may have a balance reflected by destination account data 145, described herein with reference to FIGS. 2-4. In an exemplary embodiment, if destination account 410 has a balance, account holder 180 earns interest at a fixed or variable interest rate on the account balance. The fixed or variable interest rate can be determined by financial institution A 125 or determined based in whole or in part on any other known method for determining interest rates on deposited funds. Interest determination unit 130 determines an amount of interest that has accrued on a balance of destination account 145 at a predetermined time, for instance, on a daily, weekly, monthly or yearly basis. Thereafter, processing unit 120 receives data from interest determination unit 130 indicating the accrued interest and stores this data in memory unit 170 in association with destination account 410 so that destination account data 145 reflects the increase in the account balance.

In an alternative embodiment described in more detail herein with reference to FIG. 3, funds are transferred from source account 415 to destination account 410 by transfer 435 only upon request by account holder 180 after (or before) a respective attempted transaction by account holder 180. In a further alternative embodiment, funds are transferred from source account 415 to destination account 410 by financial institution A 125 or by financial institution B 150 automatically after account holder 180 initiates the transaction with merchant 180. For instance, upon processing unit 120 receiving data from merchant 110 indicating a transaction amount, processing unit 120 automatically transmits request 430 to processing unit 155 requesting a transfer equal to the transaction amount be transferred to destination account 410. Alternatively, account holder 180 can contact financial institution A 125 or financial institution B 150 to request transfer 435 for a specific amount of money at least equal to the transaction amount. Account holder 180 can also request when transfer 435 should occur to assure that the appropriate funds are present in destination account 410 for covering the transaction amount and/or any future transactions using transaction card 105 or other transaction vehicle at merchant 110.

In the exemplary embodiments of the present application, the funds are transferred out of destination account on daily basis, hourly basis or less. As a result, destination account 410 is operable as a pass-through account and therefore can have a balance for no period of time or for a limited period of time. As will be appreciated by a person having ordinary skill in the art, destination account 410 may not have funds deposited therein. Rather, destination account 410 may have, for example, debit units or a negative amount so that the appropriate entity, such as financial institution A 125, keeps track of how much is paid out and how much to request from the respective source account(s) of account holder 180.

FIG. 3 illustrates another exemplary flow diagram for processing and for funding a transaction according to the exemplary embodiments of the present application. As shown in FIG. 3, like the exemplary embodiment described herein with reference to FIG. 2, transaction data including at least a transaction amount and an account number is received by processing unit 120 of financial institution A 125 via communication link 115 or otherwise depending on the transaction vehicle used by account holder 180, in 310.

Figure 5:
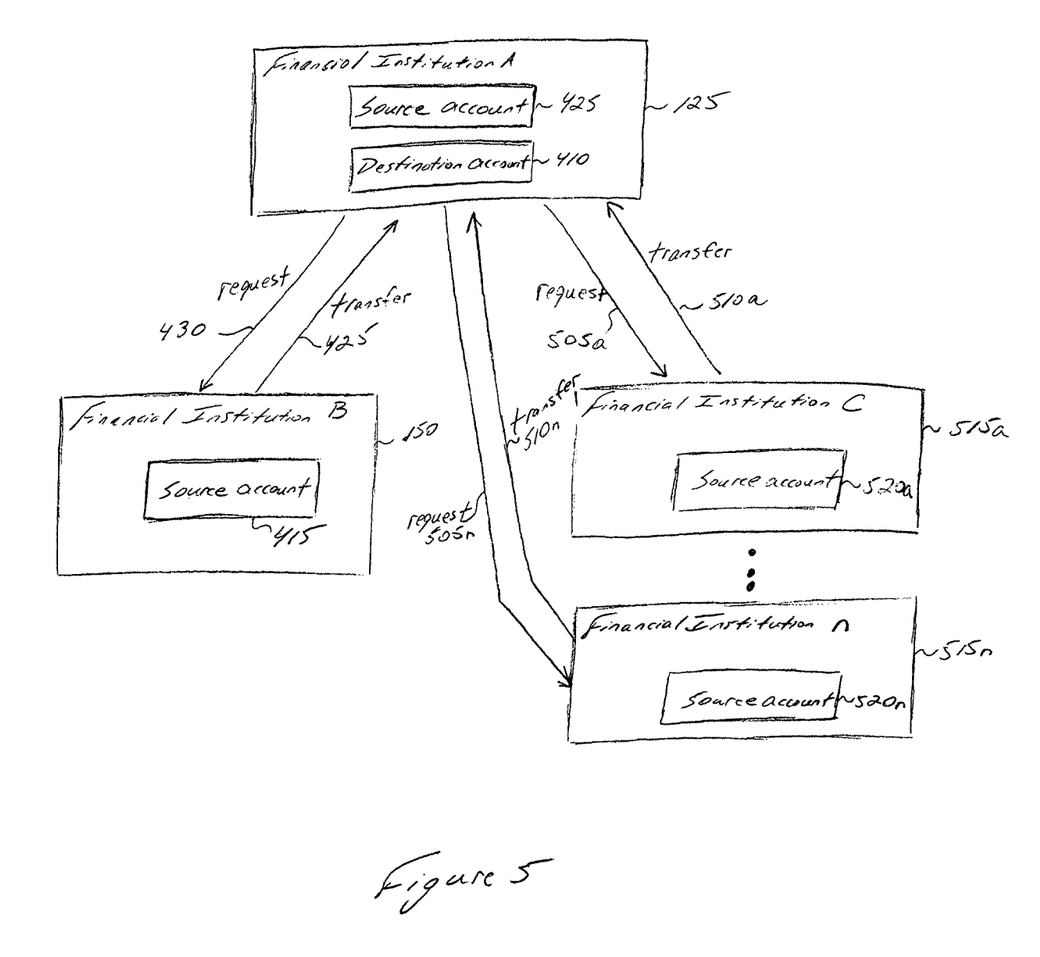
FIG. 5 illustrates another exemplary transaction system.

Processing unit 120 then requests transfer 435 by transmitting request 430 for an amount equal to the transaction amount to be electronically transferred from source account 415 associated with financial institution B 150, or other source account as described in the present application with reference to FIG. 5, to destination account 410 associated with financial institution A 125, in 315. Transfer 435 can result either from account holder 180 requesting the transfer or from financial institution A 125 requesting the transfer. Processing unit 120 through processing unit 155 associated with financial institution B 150 checks the balance of source account 415, or through a processing unit of another financial institution if another source account is being checked, to determine if the respective source account is sufficient for funding the transaction. As will be appreciated by a person having ordinary skill in the art, various systems and methods can be used to check the balance of an account associated with a third party and the present application is not meant to be limited to any particular system or method. One exemplary system and method is offered by CashEdge. If it is determined that the balance or credit line of source account 415 is sufficient to fund the transaction, then processing unit 120 thereafter receives the funds through transfer 435 via communication link 165 or otherwise, in 320. If it is determined that the balance or credit line of source account 415 is not sufficient to fund the transaction, a credit line associated with financial institution A 125 or financial institution B 150, or another demand account associated with account holder 180 is accessed by processing unit 120 to cover the amount of the attempted transaction or a portion thereof. Account holder 180 can also be charged a predetermined transaction fee for utilizing the overdraft protection benefit associated with transaction card 105. The credit line or deposit account may or may not be linked to only destination account 145 or be operable for only serving an overdraft protection function. Also, the deposit account may or may not be a checking account.

In the exemplary embodiments described with reference to FIGS. 2 and 3, an account holder can be offered debit functionality linked to an account, such as destination account 410, yet provided a predetermined delay before the transaction is funded through ACH or otherwise and provided a system and method for the account holder to challenge the validity of the respective transaction during the predetermined delay. Accordingly, the account holder is provided with enhanced fraud protection.

The predetermined delay is provided during the settlement phase of a transaction. The following is an exemplary transaction and settlement process for the exemplary embodiments described in the present application and is used for explanary purposes only and therefore is not meant to limit the scope of the present application. In the following example, the participants are financial institution A 125 (a transaction vehicle issuer), account holder 180, merchant 110, a merchant acquirer, a card association, a host system, financial institution B 150 (an account holder bank) and a third party agent. The role of the merchant acquirer, the card association and the host system in the transaction and settlement process are well known in the art and therefore are not described in detail in the present application and not shown in the drawings.

Account holder 180 uses transaction card 105 at merchant 110 to make a $100 purchase. A POS terminal at merchant 110 sends a request for approval to the merchant acquirer. The merchant acquirer forwards the request for approval to the card association, for instance, for PIN/Debit networks, the request is sent to Star, Interlink, Maestro or Cirrus, and for signature Debit, the request is sent to Visa® or MasterCard®. The card association routes the request for approval to the host system. The host system, for instance, associated with First Data® Corporation or Metavante®, serves as the agent for financial institution A 125. Alternatively, financial institution A 125 serves as the host system.

The host system determines if account holder 180 is within a spending limit for the respective account, such as destination account 410. The spending limit for a given day is provided to the host system in a batch file by financial institution A 125 the night before. Alternatively, the host system calculates an internal spending limit, including cumulative purchases up until a final batch sent to financial institution A 125 at day's end. If within the spending limit, the host system sends approval back to the card association, which returns approval to the merchant acquirer, which returns approval to merchant 110. If not within the spending limit, a decline is sent. Alternatively, the host system sends an alert to account holder 180 notifying account holder 180 that he or she is approaching the spending limit. Merchant 110 provides goods/services to account holder 180.

An exemplary settlement process is as follows. The host system sends $98 through the card association. The host system pulls money from the pooled account at financial institution A 125. The card association forwards $97 to the merchant acquirer, that is, the card association makes $1. The merchant acquirer places $97 in an account of merchant 110. The merchant acquirer makes money from the banking relationship or other contract with merchant 110. The host system sends an ACH request to financial institution A 125 for payment of $98 on the $100 purchase. The ACH request is sent at the end of day, in batch, by account number and amount spent for account holder 180. Alternatively, the ACH request is sent real-time upon approval. The transaction vehicle issuer sends $98 to the host system either at the end of the day in batch or alternatively in real time.

Figure 6:
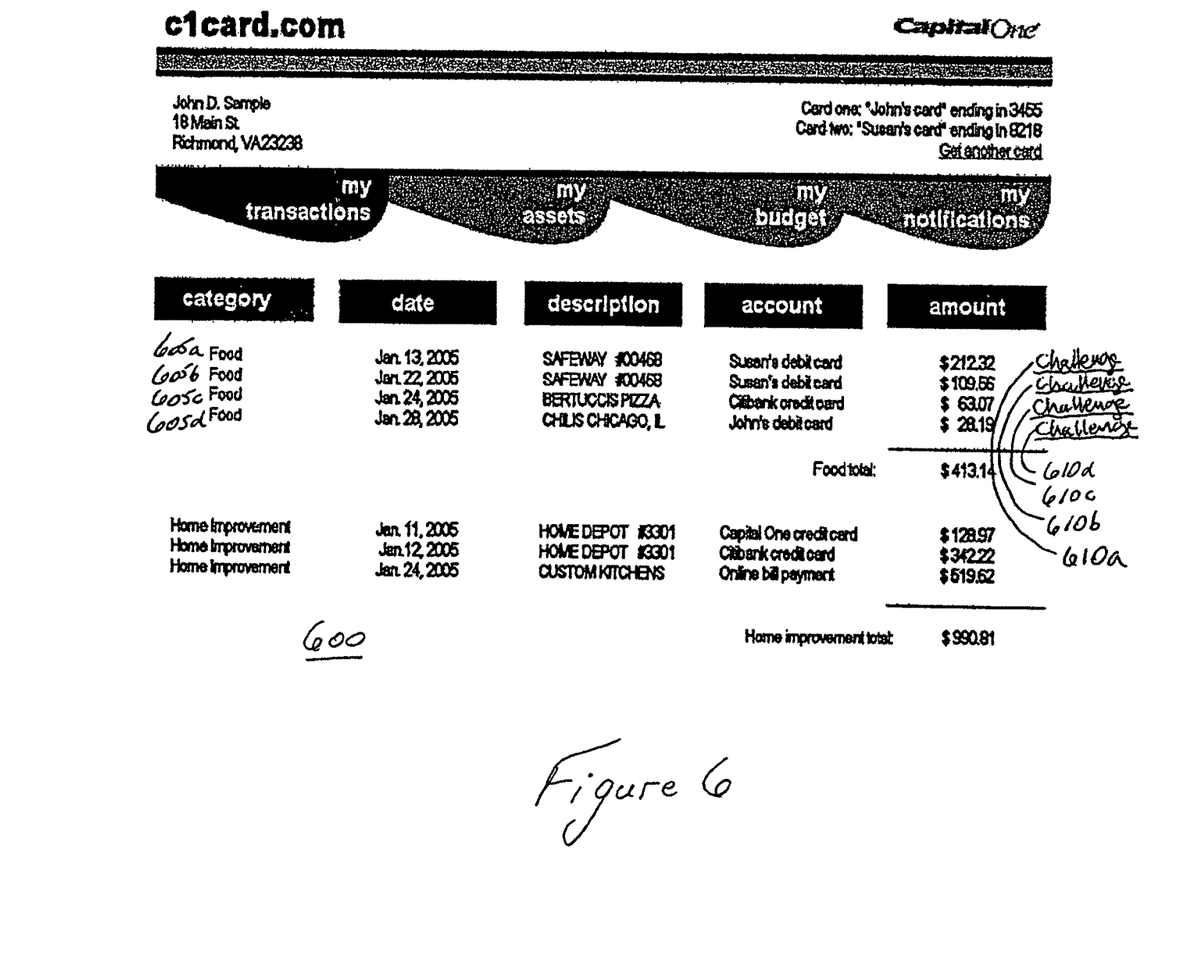
FIG. 6 illustrates an exemplary webpage providing an account holder the ability to view a pending transaction and to challenge the validity of that transaction.

Financial institution A 125 sends an ACH request to financial institution B 150 for $100. The ACH request, however, is sent after a predetermined delay. In the present application, the predetermined delay is not limited to any particular time and, therefore, can be any number of hours or days. Also, the predetermined delay can commence when payment is made to the host system or otherwise. The predetermined delay provides account holder 180 the ability to review one or more transactions, for example, by accessing a web page, verify that those transactions are valid, for example, belong to account holder 180, and functionality for account holder 180 to challenge any one of those transactions if wrong before final withdraw from financial institution B 150 or elsewhere. FIG. 6 illustrates an exemplary web page 600 that provides account holder 180 with the ability to challenge one or more transactions. As can be seen in FIG. 6, account holder 180 can click on one or more of the hyperlinks 610*a* . . . 610*d* associated with one or more of the respective transactions 610*a* . . . 610*d* to challenge that transaction. Account holder 180 may be presented with a confirmation question to verify and confirm that account holder 180 truly wants to challenge a respective transaction. As a result of clicking on a particular hyperlink during the predetermined period of delay, the funds are not removed from the account at the account holder bank. To determine whether a fraud has been committed, any fraud resolution process, for instance, those processes known in the art that are implemented when an individual disputes a debit transaction associated with a debit card or a credit transaction associated with a credit card, can be used with the exemplary embodiments of the present application. Such fraud resolution processes are well known to a person having ordinary skill in the art and are, therefore, not described in detail in the present application.

Alternatively, a third party agent, for example, CashEdge, sends an ACH request to financial institution B 150 or elsewhere. The ACH requests can be batched by account holder. In a further alternative embodiment, third party agent or other entity uses screen scraping to determine if account holder 180 has enough available funds in the respective account at financial institution B 150 or elsewhere to complete the ACH request, that is, a service such as CashEdge will login to financial institution B 150 or elsewhere with account holder information provided by account holder 180 and will check the balance from predetermined configurations.

If account holder 180 has insufficient funds in the account at financial institution B 150, the transaction vehicle issuer resends the ACH request, for instance, daily, to complete the draft until full funds are available. If or when account holder 180 has sufficient funds in the account at financial institution B 150 or elsewhere, the account holder bank sends $100 to transaction vehicle issuer from the account at financial institution B 150 or elsewhere. In this example, financial institution A 125 makes $2 on the transaction.

Additional source accounts other than source account 425 and source account 415 are linked to destination account 410 and can fund destination account 410, as shown in FIG. 5. FIG. 5 illustrates financial institution A 125 being linked to a plurality of other financial institutions-financial institutions 515*a* . . . 515*n*. Accordingly, financial institution A 125 can submit requests 505*a* . . . 505*n* to financial institutions 515*a* . . . 515*n*, respectively, for funds to be transferred and financial institutions 515*a* . . . 515*n* can transmit fund transfers 510*a* . . . 510*n*, respectively, to financial institution A 125. As will be appreciated by a person having ordinary skill in the art, source account 425, source account 415 and any of the additional source accounts 520 . . . 520*n* can be replaced by account holder 180 or, alternatively, account holder 180 can add other source accounts as desired.

In an exemplary embodiment of the present application, processing unit 120 associated with financial institution A 125 determines which source account or source accounts amongst the plurality of source accounts 425, 415, 520*a* . . . 520*n* to submit a request for a fund transfer. Processing unit 120 can proceed in a predetermined sequential order when determining which of the plurality of source accounts to submit a request or according to any other predefined instructions, or can randomly select a source account amongst the plurality of source accounts. For instance, processing unit 120 can access a predefined sequential order stored in memory unit 170, source account 520*a* being first in the order. Thereafter, processing unit 120 requests transfer 510*a* by transmitting request 505*a* for an amount equal to the transaction amount to be electronically transferred from source account 520*a* associated with financial institution 515*a* to destination account 410 associated with financial institution A 125. If processing unit 120 determines that the balance or credit line of source account 520*a* is less than the transaction amount, then processing unit 120 can access one or more other source accounts in the predefined sequential order for the entire transaction amount or a portion thereof until the transaction amount can be funded. Furthermore, a source account may be chosen based on transaction amount, based on transaction type, for example, point-of-sale, card not present, Internet or mail order, or based on merchant type. A predetermined percentage from multiple source accounts can also used to fund the transaction amount.

Again referring to FIG. 4, processing unit 120 updates destination account data 145 stored in memory unit 170 associated with account holder 180 by increasing the stored balance data by the amount of transfer 435 or one or more other transfers, in 325. Further, processing unit 155 of financial institution B 150 updates source account data 175 stored in memory unit 160, or one or more other source accounts, also associated with account holder 180 by decreasing the stored balance data by the amount of the transfer. Processing unit 120 then authorizes the attempted transaction and transmits authorization data to merchant 110 via communication link 115, in 330. Alternatively, the authorization data is transmitted before receiving funds in 320 or before requesting transfer 435 or one or more other transfers in 315. Before or after transmitting the authorization data, processing unit 120 again updates destination account data 145 stored in memory unit 170 associated with account holder 180 by decreasing the stored balance data by the transaction amount, in 325. In an alternative embodiment, processing unit 120 does not update the balance data of destination account 410, for instance, by first increasing the balance data and then decreasing the balance data by the same amount, as described herein with reference to 325 and 335. Rather, the balance data is not altered for the net result of the balance is the same.

Besides requesting transfer 435, 510*a* . . . 510*n* on a per transaction basis, transfer 435, 510*a* . . . 510*n* can occur once a day, for example, at the end of the day, for an amount equal to the cumulative amount of all transactions conducted by account holder 180 during that respective day. Alternatively, transfer 435, 510*a* . . . 510*n* can occur after a predetermined number of hours or days have elapsed, the amount of transfer 435, 510*a* . . . 510*n* equaling the cumulative amount of all transactions conducted by account holder 180 during the predetermined number of hours or days preceding the transfer. Transaction system 100 can also impose a transaction volume limit for destination account 410, for example, no more than a predetermined number of transactions by account holder 180 per day, and can impose a transaction amount limit on destination account 410, for example, no transaction amounts exceeding a predetermined amount or the cumulative value of transactions over a predetermined period of time cannot exceed a particular amount.

In another exemplary embodiment of the present application, the source account from which a predetermined amount of money originates is associated with financial institution A 125, as opposed to financial institution B 150.

For example, source account data 140 associated with source account 425 is stored in memory unit 170 of financial institution A 125, as depicted in FIG. 1. As a result, processing unit 120 either automatically or upon request by account holder 180 request transfers from source account 425 to destination account 410 or automatically receives transfers from source account 425 as described herein with reference to FIGS. 2 and 3. As will be appreciated by a person having ordinary skill in the art, funds can be transferred internally within a financial institution or funds can be transferred from one account associated with the institution to another account associated with the same institution using communication link 165.

Destination account 410 may have a balance reflected by destination account data 145, described herein with reference to FIGS. 2-5. In an exemplary embodiment, if destination account 410 has a balance, account holder 180 earns interest at a fixed or variable interest rate on the account balance. For example, destination account 410 has a balance if the amount of transfer 435, 510$a$ . . . 510$n$ exceeds the amount of a transaction or transactions that need to be funded or the funds remain deposited in destination account 410 for a period of time before the funds are used to remunerate merchant 110. The fixed or variable interest rate can be determined by financial institution A 125 or determined based in whole or in part on any other known method for determining interest rates on deposited funds. Interest determination unit 130 determines an amount of interest that has accrued on a balance of destination account 145 at a predetermined time, for instance, on a daily, weekly, monthly or yearly basis. Thereafter, processing unit 120 receives data from interest determination unit 130 indicating the accrued interest and stores this data in memory unit 170 in association with destination account 410 so that destination account data 145 reflects the increase in the account balance.

As can be seen in FIG. 1, processing unit 120 is also coupled to reward determination unit 135. In an exemplary embodiment, reward determination unit 135 determines whether a respective account holder, for example, account holder 180, is entitled to a reward. If it is determined that account holder 180 is entitled to a reward, the particular reward is determined by reward determination unit 135 and then associated with an account, such as a reward account, of account holder 180 so that account holder 180 can later redeem the reward.

Transactions conducted by account holder 180 using a transaction vehicle, such as transaction card 105 or an associated account number, are processed using an interchange rate, as described in the present application. The use of a high interchange rate, for instance, a credit interchange rate, as opposed to a lower interchange rate, such as a debit interchange rate, affords issuers, such as financial institution 125, a financial benefit and these issuers extend reward opportunities associated with a reward program to account holders like account holder 180. As will be appreciated by a person having ordinary skill in the art, any interchange rate which provides a greater financial benefit to the respective financial institution can be used regardless of the nomenclature, for instance, regardless whether the interchange rate is referred to as a credit or a debit interchange rate.

In an exemplary embodiment, account holder 180 participates in a reward program associated with financial institution A 125 and thereby earns rewards, incentives or the like, for instance, by engaging in transactions with merchants, such as merchant 110, using a transaction vehicle, such as transaction card 105, associated with a qualified financial account, for instance, destination account 410, and later redeeming those accumulated rewards, incentives or the like with merchant 110 or with other merchants. Under the reward program, account holder 180 has the ability to earn a plurality of reward units, such as points, for example, for purchases with merchant 110 and other merchants using a qualified financial account—destination account 410 as described herein.

The present application is applicable, to any institution or company having a membership reward program associated therewith, including financial institutions, airlines, supermarkets, hotels, car rental companies, retail stores, Internet loyalty programs, loyalty providers, such as Carlson Companies, Inc. and Cendant Corporation, and Visa® and MasterCard® that offer rewards, incentives or the like. In an exemplary embodiment of the present application, the membership reward program is managed directly by the institution or company, for instance, financial institution A 125. Alternatively, the membership reward program is managed by a third party associated with financial institution A 125. Financial institution A 125 may or may not be in a partnership with a third party and/or other party. For instance, in the event financial institution A 125 has a partnership relationship with the third party and/or other party, the relationship may involve a co-branding.

The membership reward program can also be operable as an independent reward program, as an accelerator reward program, as a coalition reward program or otherwise, or as a combination thereof. As would be appreciated by a person having ordinary skill in the art, when enrolled in an accelerator program, an account holder accelerates the earning of reward units or the like in another reward program independent of the accelerator program, for example, when conducting transactions with an account linked to the accelerator program. A coalition reward program, such as Upromise (www.upromise.com), is operable for account holders to earn rewards from a particular suite of merchants. Other reward programs can be associated with the coalition reward program. When an account holder conducts a transaction with one of the merchants within the suite using one of these other reward programs, that account holder earns additional rewards. For instance, a reward program associated with a coalition reward program is operable for account holders to earn X % for every transaction regardless of the merchant and an additional Y % for transactions conducted with one of the merchants within the suite and an additional Z % at another one of the merchants within the suite.

Accordingly, two or more membership reward programs can be linked together so that account holder 180 earns reward units or the like in a single rewards account from various sources.

The exemplary embodiments of the present application are described herein with reference to reward units as being points, and earning and redeeming the same. The present application, however, is not limited to points, as points are units merely symbolizing a form of currency for use towards transactions. Hence, other symbols operable as currency are equally applicable to the exemplary embodiments of the present application, for instance, miles, stars, dollars, cash, rebates or credits.

In an exemplary embodiment, account holder 180 participating in the membership reward program earns (and redeems) points when conducting transactions with merchant 110 and other merchants. These points are earned by account holder 180, for example, upon account holder 180 conducting transactions with merchant 110 using destination account 410. Earning and redeeming currency units, such as points, associated with a membership reward program are well known in the art and are therefore not described in detail herein. Account holder 180 can also earn and redeem other rewards, including, for example, gift certificates, coupons, companion airplane tickets, or other goods or services. The present application is not limited to these rewards, as they are merely exemplary. Also, in an alternative embodiment, account holder 180 may not participate with any reward program and therefore not have the ability to earn and redeem rewards.

According to the embodiments described in the present application, transaction system 100 is operable for an institution (for example, financial institution A 125) other than the institution (for example, financial institution B 150) offering account holder 180 an account (for example, source account 415), such as a checking account, to issue one or more transaction vehicles, for example, a transaction card, linked to this account through communication link 165. Destination account 410 is operable as a pass-through account in that one or more source accounts, such as source accounts 425, 415, 520$a$ . . . 520$n$, can be used to fund transactions initiated with the transaction vehicle and as a result destination account 410 does not have a balance or has a balance for limited period of time.

In an exemplary embodiment, when the transaction vehicle is transaction card 105 and a credit interchange rate is used, to merchant 110, transaction card 105 appears as a credit card and is processed as a credit card since the credit card interchange rate is imposed on each transaction. To account holder 180, though, transaction card 105 operates like a debit card, because with every transaction, at the end of each day or at some other time, a transaction, for example, an ACH transaction, would debit source account 415 of account holder 180 for the amount of the purchase(s). Hence, transaction card 105 is, for example, a credit card behaving like a debit card due to the use of ACH. The use of communication link 165 enables account holder 180 flexibility in that account holder 180 can get a transaction card from one institution, for example, a credit card company, while having his or her demand deposit account or other type of account at another institution, such as a bank.

The embodiments described above are illustrative examples of the present application and it should not be construed that the present application is limited to these particular embodiments. Various changes and modifications may be effected by one skilled in the art without departing from the spirit or scope of the invention as defined in the appended claims.

We claim:

1. A method for processing a purchase transaction between an account holder and a merchant, the method comprising:

identifying a credit account and a demand deposit account, the credit account and demand deposit account each associated with the account holder, the credit account being associated with and including credit account data stored in one or more memory units of a first financial institution and the demand deposit account being associated with and including debit account data stored in one or more memory units of a second financial institution;

receiving at the first financial institution, via an authorization network, transaction data associated with a purchase transaction initiated by the account holder with the merchant using the credit account, the purchase transaction having a transaction amount;

providing authorization data to the merchant for the purchase transaction via the authorization network;

transferring from the first financial institution to the merchant, via the authorization network and after providing the authorization data, at least a portion of the transaction amount to pay the merchant from the credit account; and using one or more computer processors, requesting from the first financial institution payment of the at least a portion of the transaction amount, wherein:

the first financial institution requests from the second financial institution an automated clearing house transfer of the transaction amount from the second financial institution to the first financial institution, the request made via an automated clearing house network after a predetermined delay period, the predetermined delay period providing fraud protection to the account holder before withdrawal of the transaction amount by:

initiating the predetermined delay period, via the first financial institution via a network, upon providing the authorization data to the merchant, providing an online user interface on a device of the account holder, by the first financial institution, to enable the account holder to review the purchase transaction and determine whether to challenge the purchase transaction, the online user interface including a hyperlink that when clicked by the account holder initiates a challenge process indicating that the account holder believes the purchase transaction is fraudulent, and automatically transmitting the request upon expiration of the predetermined delay period if the hyperlink is not clicked by the account holder during the predetermined delay period, or initiating a fraud resolution process if the account holder clicks the hyperlink during the predetermined delay period and automatically transmitting the request if no fraud is determined during the fraud resolution process, or initiating the fraud resolution process if the account holder clicks the hyperlink during the predetermined delay period and not withdrawing the transaction amount from the second financial institution by not processing the request if fraud is determined during the fraud resolution process, the first financial institution receives the automated clearing house transfer via the automated clearing house network, and updating the credit account data and demand deposit account data stored in the one or more memory units of the respective financial institutions by effectuating an increase or decrease thereof, respectively, based on the automated clearing house transfer of the transaction amount.

2. The method of claim 1, wherein the demand deposit account is a checking account, savings account, or money market account.

3. The method of claim 1, wherein the account holder uses a transaction card to initiate the purchase transaction, the transaction card associated with the credit account and the demand deposit account.

4. The method of claim 1, wherein providing authorization data for the purchase transaction comprises determining whether the transaction amount is within a spending limit.

5. The method of claim 4, wherein the spending limit is provided by the first financial institution.

6. The method of claim 4, wherein the spending limit is calculated internally.

7. The method of claim 4, further comprising:
providing an alert notifying the account holder that the account holder is approaching the spending limit.

8. The method of claim 1, wherein the payment is requested on a predetermined day or time.

9. The method of claim 1, wherein the payment is requested on a scheduled basis.

10. The method of claim 1, further comprising:
receiving the payment on a predetermined day or time.

11. The method of claim 1, further comprising:
receiving the payment on a scheduled basis.

12. The method of claim 1, wherein a credit card interchange rate is imposed on the purchase transaction, the credit card interchange rate being a percentage of the transaction amount.

13. The method of claim 12, wherein a reward is provided to the account holder once the purchase transaction is completed.

14. A method for processing a purchase transaction between an account holder and a merchant, the method comprising:
identifying a credit account and a demand deposit account, the credit account and demand deposit account each associated with the account holder, the credit account being associated with and including credit account data stored in one or more memory units of a first financial institution, and the demand deposit account being associated with and including debit account data stored in one or more memory units of a second financial institution;
receiving from a host system a request for payment of at least a portion of a transaction amount using the credit account, wherein:
the transaction amount corresponds to a purchase transaction initiated by the account holder with the merchant using the credit account,
the host system provides authorization data to the merchant, via an authorization network, for the purchase transaction, and
the host system transfers the at least a portion of the transaction amount, via the authorization network and after providing the authorization data, to pay the merchant from the credit account;
posting the purchase transaction to the credit account;
providing the payment to the host system;
using one or more computer processors, requesting from the second financial institution associated with the demand deposit account an automated clearing house transfer of the transaction amount from the second financial institution associated with the demand deposit account to the first financial institution associated with the credit account, the request made via an automated clearing house network after a predetermined delay period, the predetermined delay period providing fraud protection to the account holder before withdrawal of the transaction amount by:
initiating the predetermined delay period, via the first financial institution via a network, upon providing the authorization data to the merchant,
providing an online user interface on a device of the account holder, by the first financial institution, to enable the account holder to review the purchase transaction and determine whether to challenge the purchase transaction, the online user interface including a hyperlink that when clicked by the account holder initiates a challenge process indicating that the account holder believes the purchase transaction is fraudulent, and
automatically transmitting the request upon expiration of the predetermined delay period if the hyperlink is not clicked by the account holder during the predetermined delay period, or
initiating a fraud resolution process if the account holder clicks the hyperlink during the predetermined delay period and automatically transmitting the request if no fraud is determined during the fraud resolution process, or
initiating the fraud resolution process if the account holder clicks the hyperlink during the predetermined delay period and not withdrawing the transaction amount from the second financial institution by not processing the request if fraud is determined during the fraud resolution process; and
receiving the automated clearing house transfer via the automated clearing house network, and updating the credit account data and demand deposit account data stored in the one or more memory units of the respective financial institutions by effectuating an increase or decrease thereof, respectively, based on the automated clearing house transfer of the transaction amount.

15. The method of claim 14, wherein the demand deposit account is a checking account, savings account, or money market account.

16. The method of claim 14, wherein the account holder uses a transaction card to initiate the purchase transaction, the transaction card associated with the credit account and the demand deposit account.

17. The method of claim 14, wherein the host system determines whether the transaction amount is within a spending limit.

18. The method of claim 17, further comprising:
providing the spending limit to the host system.

19. The method of claim 14, wherein the payment is requested on a predetermined day or time.

20. The method of claim 14, wherein the payment is requested on a scheduled basis.

21. The method of claim 14, wherein the payment is provided on a predetermined day or time.

22. The method of claim 14, wherein the payment is provided on a scheduled basis.

23. The method of claim 14, wherein the automated clearing house transfer is requested on a predetermined day or time.

24. The method of claim 14, wherein the automated clearing house transfer is received on a predetermined day or time.

25. The method of claim 14, wherein a credit card interchange rate is imposed on the purchase transaction, the credit card interchange rate being a percentage of the transaction amount.

26. The method of claim 25, wherein a reward is provided to the account holder once the purchase transaction is completed.

27. A system for processing a purchase transaction between an account holder and a merchant, the system comprising one or more computer processors collectively programmed to:
identify a credit account and a demand deposit account, the credit account and demand deposit account each associated with the account holder, the credit account being associated with and including credit account data stored in one or more memory units of a first financial institution, and the demand deposit account being associated with and including debit account data stored in one or more memory units of a second financial institution;
receive from a host system a request for payment of at least a portion of a transaction amount using the credit account, wherein:
the transaction amount corresponds to a purchase transaction initiated by the account holder with the merchant using the credit account,
the host system provides authorization data to the merchant, via an authorization network, for the purchase transaction, and
the host system transfers the at least a portion of the transaction amount, via the authorization network and after providing the authorization data, to pay the merchant from the credit account;
post the purchase transaction to the credit account;
provide the payment to the host system;
request from the second financial institution associated with the demand deposit account an automated clearing house transfer of the transaction amount from the second financial institution associated with the demand deposit account to the first financial institution associated with the credit account, the request made via an automated clearing house network after a predetermined delay period, the predetermined delay period providing fraud protection to the account holder before withdrawal of the transaction amount by:
initiating the predetermined delay period, via the first financial institution via a network, upon providing the authorization data to the merchant,
providing an online user interface on a device of the account holder, by the first financial institution, to enable the account holder to review the purchase transaction and determine whether to challenge the purchase transaction, the online user interface including a hyperlink that when clicked by the account holder initiates a challenge process indicating that the account holder believes the purchase transaction is fraudulent, and
automatically transmitting the request upon expiration of the predetermined delay period if the hyperlink is not clicked by the account holder during the predetermined delay period, or
initiating a fraud resolution process if the account holder clicks the hyperlink during the predetermined delay period and automatically transmitting the request if no fraud is determined during the fraud resolution process, or
initiating the fraud resolution process if the account holder clicks the hyperlink during the predetermined delay period and not withdrawing the transaction amount from the second financial institution by not processing the request if fraud is determined during the fraud resolution process; and
receive the automated clearing house transfer via the automated clearing house network, and update the credit account data and demand deposit account data stored in the one or more memory units of the respective financial institutions by effectuating an increase or decrease thereof, respectively, based on the automated clearing house transfer of the transaction amount.

28. A non-transitory computer-accessible medium encoded with computer program code effective to perform the following:

identify a credit account and a demand deposit account, the credit account and demand deposit account each associated with an account holder, the credit account being associated with and including credit account data stored in one or more memory units of a first financial institution, and the demand deposit account being associated with and including debit account data stored in one or more memory units of a second financial institution;
receive from a host system a request for payment of at least a portion of a transaction amount using the credit account, wherein:
the transaction amount corresponds to a purchase transaction initiated by the account holder with the merchant using the credit account,
the host system provides authorization data to the merchant, via an authorization network, for the purchase transaction, and
the host system transfers the at least a portion of the transaction amount, via the authorization network and after providing the authorization data, to pay the merchant from the credit account;
post the purchase transaction to the credit account;
provide the payment to the host system;
request from the second financial institution associated with the demand deposit account an automated clearing house transfer of the transaction amount from the second financial institution the demand deposit account to the first financial institution associated with the credit account, the request made via an automated clearing house network after a predetermined delay period, the predetermined delay period providing fraud protection to the account holder before withdrawal of the transaction amount by:
initiating the predetermined delay period, via the first financial institution via a network, upon providing the authorization data to the merchant,
providing an online user interface on a device of the account holder, by the first financial institution, to enable the account holder to review the purchase transaction and determine whether to challenge the purchase transaction, the online user interface including a hyperlink that when clicked by the account holder initiates a challenge process indicating that the account holder believes the purchase transaction is fraudulent, and
automatically transmitting the request upon expiration of the predetermined delay period if the hyperlink is not clicked by the account holder during the predetermined delay period, or
initiating a fraud resolution process if the account holder clicks the hyperlink during the predetermined delay period and automatically transmitting the request if no fraud is determined during the fraud resolution process, or
initiating the fraud resolution process if the account holder clicks the hyperlink during the predetermined delay period and not withdrawing the transaction amount from the second financial institution by not processing the request if fraud is determined during the fraud resolution process; and
receive the automated clearing house transfer via the automated clearing house network, and update the credit account data and demand deposit account data stored in the one or more memory units of the respective financial institutions by effectuating an increase or decrease thereof, respectively, based on the automated clearing house transfer of the transaction amount.

* * * * *